(12) United States Patent
Klein et al.

(10) Patent No.: US 12,734,853 B1
(45) Date of Patent: Sep. 15, 2026

(54) SLIPPER LEAF SPRING SUSPENSION SYSTEMS WITH COMPLIANT TORQUE-AND-LOAD WEAR PAD DAMPERS

(71) Applicants: Jason M. Klein, Springfield, MO (US); Kevin C. Schlack, Ozark, MO (US)

(72) Inventors: Jason M. Klein, Springfield, MO (US); Kevin C. Schlack, Ozark, MO (US)

( * ) Notice: Subject to any disclaimer, the term of this patent is extended or adjusted under 35 U.S.C. 154(b) by 0 days.

(21) Appl. No.: 18/619,963

(22) Filed: Mar. 28, 2024

Related U.S. Application Data

(60) Provisional application No. 63/492,817, filed on Mar. 29, 2023.

(51) Int. Cl.
*B60G 7/00* (2006.01)

(52) U.S. Cl.
CPC .......... *B60G 7/001* (2013.01); *B60G 2200/31* (2013.01); *B60G 2202/11* (2013.01); *B60G 2204/121* (2013.01)

(58) Field of Classification Search
CPC ........................... B60G 7/001; B60G 2202/11; B60G 2200/31; B60G 2204/121; B60G 2204/4104; B60G 5/047; B60G 11/04; B60G 11/107; B60G 11/12
See application file for complete search history.

(56) References Cited

U.S. PATENT DOCUMENTS

| | | | | |
|---|---|---|---|---|
| 2,455,989 A | | 12/1948 | Frazier | B60G 5/047 |
| 2,577,322 A | | 12/1951 | Frazier | B60G 5/047 |
| 2,653,035 A | | 9/1953 | Ward | B60G 5/047 |
| 2,958,526 A | | 11/1960 | Ulderup | F16F 1/387 |
| 3,123,377 A | * | 3/1964 | Hutchens | B60G 5/047 280/682 |
| 3,194,580 A | | 7/1965 | Hamlet | B60G 11/04 |
| 3,195,916 A | * | 7/1965 | Cain | B60G 5/047 403/228 |
| 3,304,096 A | | 2/1967 | Hanover | B60G 5/047 |
| 3,493,222 A | | 2/1970 | Mathers | B60G 11/10 |
| 3,801,086 A | | 4/1974 | Raidel | B60G 9/003 |
| 3,933,367 A | | 1/1976 | Tamas | B60G 5/047 |
| 4,003,562 A | | 1/1977 | Kaiser | B60G 11/12 |

(Continued)

OTHER PUBLICATIONS

Cush Corp. version of standard slipper spring type mechanical suspension with rigid torque arms and standard size torque rod bushings in the forward and trailing positions of each arm, an image taken from a product brochure of Cush Corp., copyright 2016.

(Continued)

*Primary Examiner* — James A English
(74) *Attorney, Agent, or Firm* — Jonathan A. Bay

(57) ABSTRACT

For slipper spring vehicle suspension, a compliant torque-and-load wear pad damper has a steel tubular inner sleeve and an oversized steel tubular outer sleeve which together define a lumen defining a generously-sized cylindrical annular space, as well as an elastomeric intermediate sleeve press-fitted tightly into the cylindrical annular space and immovably fixed to both sleeves. The elastomeric has stiffness properties that resist torsional distortion. The inner sleeve is longer than the outer sleeve and is immovably fastened with respect to its respective hanger whereby the outer sleeve is free to float subject to the stiffness of the elastomeric material that is resistant to torsional distortion.

10 Claims, 13 Drawing Sheets

(56) References Cited

U.S. PATENT DOCUMENTS

| | | | | |
|---|---|---|---|---|
| 4,033,606 | A * | 7/1977 | Ward | B60G 5/047 280/682 |
| 4,166,640 | A | 9/1979 | Van Denberg | B60G 9/003 |
| 4,213,718 | A | 7/1980 | Lumby | B60G 7/02 |
| 4,502,707 | A * | 3/1985 | Jable | B60G 5/047 280/682 |
| 4,763,921 | A * | 8/1988 | Steiner | B60G 11/107 280/682 |
| 4,991,868 | A | 2/1991 | Van Denberg | B60G 7/02 |
| 5,996,981 | A | 12/1999 | Dilling | B60G 7/02 |
| 6,446,746 | B1 | 9/2002 | Bell | B60G 5/00 |
| 8,925,944 | B2 | 1/2015 | Byrnes | B60G 7/005 |
| 10,807,428 | B1 | 10/2020 | Klein et al. | B60G 5/047 |
| 2002/0096841 | A1 | 7/2002 | Hedenberg | B60G 11/465 |
| 2003/0132593 | A1 | 7/2003 | Ross | B60G 7/02 |
| 2004/0056397 | A1 | 3/2004 | Tatura | F16F 1/387 |
| 2007/0069495 | A1 | 3/2007 | Middlebrook | B60G 9/003 |
| 2008/0277847 | A1 | 11/2008 | Missig | F16C 27/063 |
| 2014/0117176 | A1 | 5/2014 | Pierce | B60T 17/088 |
| 2014/0117639 | A1 * | 5/2014 | Ramsey | B60G 9/04 280/124.11 |
| 2016/0207370 | A1 | 7/2016 | Moeller | B60G 11/08 |
| 2017/0166024 | A1 | 6/2017 | Andreasen | F19B 39/28 |
| 2017/0166025 | A1 | 6/2017 | Auten | B60G 11/12 |

OTHER PUBLICATIONS

Volvo White GMC tractor spring suspension, taken from a page of a parts catalog belonging to Euclid® Industries, LLC (an Arvin Meritor® brand), copyright 2002.

* cited by examiner 262
254
100
256
258

200
190
212
214
216
217
218
220
224
226
234
254
258
IX-IX
VI 218
234
220
214
408,409
158
217
258
234
254
220
212
400A
401
190
408,409
216
254
258

400
408,409
404
406
402
224
220
234
408,409
262
254
190
217
256
100
258
401
408,409
400
404
406
402
226
220
234

218
234
408,409
220
214

400
158
254
258
217
190
401
408,409
400
400A
212
220
408,409
158
216
254
258

408,409
220
254

XIII
190
400
224
216
258
100
XIII 406
448
450
402
404
442
444
446
452
400

400
402
404
406
442
444
446
448
450
452,454
456
XII
XII 400
450
406
402
404
442
454
446
456
448
450
444
452
446

216
400
448
406
450
402
446
408
409
452
450
442
446
404
442
406
220
224
254
100
258
256
408
409

SLIPPER LEAF SPRING SUSPENSION SYSTEMS WITH COMPLIANT TORQUE-AND-LOAD WEAR PAD DAMPERS

CROSS-REFERENCE TO PROVISIONAL APPLICATION(S)

This application claims the benefit of U.S. Provisional Application No. 63/492,817, filed Mar. 29, 2023. The foregoing patent disclosure is incorporated herein by this reference thereto.

BACKGROUND AND SUMMARY OF THE INVENTION

The invention relates to heavy duty vehicle suspensions and, more particularly, to slipper leaf spring suspension systems provided with improvements comprising compliant torque-and-load wear pad dampers.

FIGS. 1, 2A, 2B and 3 in the present disclosure hereof correspond to FIGS. 1, 3A, 3B and 12 of commonly-invented, commonly-owned U.S. Pat. No. 10,807,428—Klein et al., entitled "Leaf Spring Suspension Systems with Compliant Oversized Pivot Bushings," the full disclosure of which is incorporated herein by this reference thereto.

It is an object of the invention to provide improvements for steel slipper leaf-spring suspension systems for tractor trailers and other heavy-duty wheeled vehicles.

Slipper leaf springs have both ends of the spring free to slip forwardly and rearwardly inside the hangers therefor. The hangers control side load with the sidewalls thereof. The hangers control vertical movement with a rigid wear pad inside of each hanger for the spring to run on (slip on). There is friction (substantial friction) between the top of the slipper leaf spring and the wear pad, and this what creates damping for the suspension.

It is a more particular object of the invention is to improve the ride characteristics of leaf spring style axle suspension system by replacing rigid metal wear pads with compliant torque-and-load wear pad dampers.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
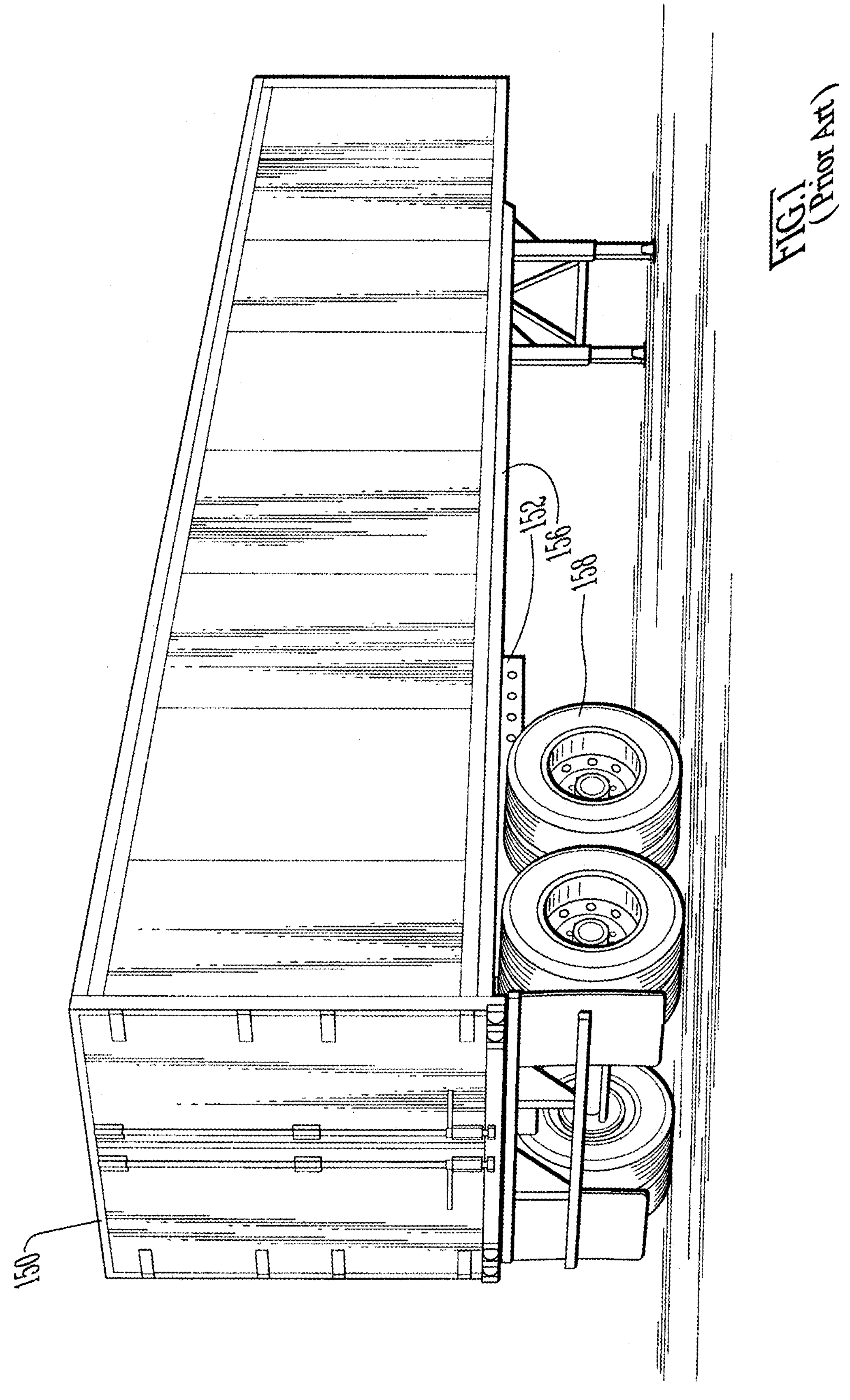
FIG. 1 is a perspective view of a conventional heavy-duty vehicle (eg., a semi-trailer constructed for a heavy-duty load rating) and is mounted on a heavy-duty vehicle suspension (see, eg., FIGS. 2A and 2B, or else FIG. 4 et al.)
Figures 2A, 2B:
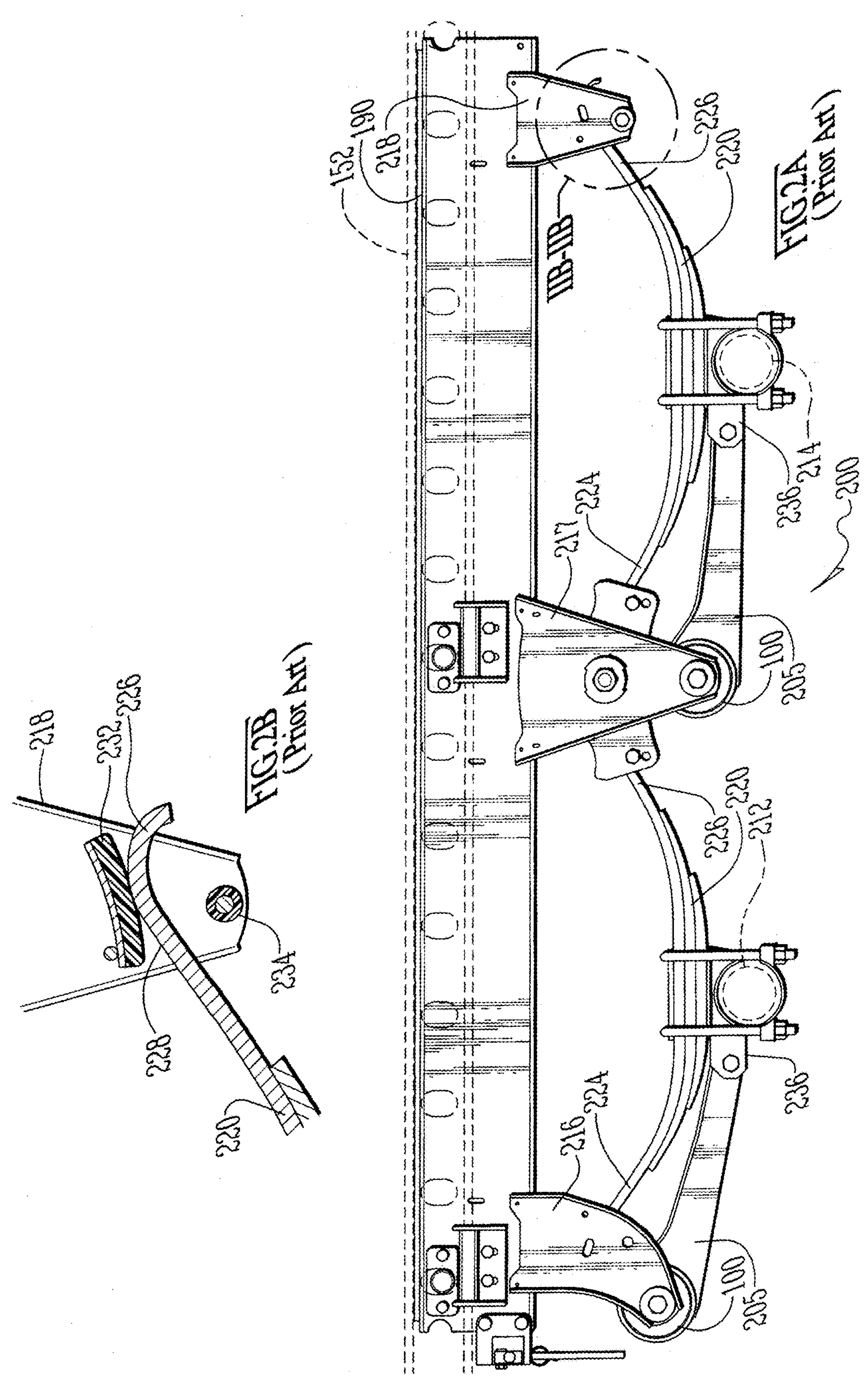
FIG. 2A is an enlarged-scale side elevational view of an overslung version (the leaf springs cross over the axles) of a slipper leaf-spring suspension system in accordance with the prior art provided with a compliant oversized pivot bushing for a torque rod.
FIG. 2B is an enlarged-scale side elevational view of the detail IIB-IIB in FIG. 2A.

FIG. 1 shows a non-exclusive example of a conventional heavy-duty vehicle 150 (eg., a semi-trailer constructed for a heavy-duty load rating) that is mounted on a sliding sub-frame 190 (not in view, but see FIG. 2A) for a heavy-duty vehicle suspension (for example and without limitation a heavy-duty vehicle suspension 200 in accordance with the prior art, and again see FIG. 2A).

I

The vehicle 150 has at least a pair of under-hung tracks 152 from which a sub-frame 190 might be slid between forward and rearward extremes. In FIG. 1, the exemplary heavy-duty vehicle 150 is a semi-trailer. The loads the trailer 150 can carry can be heavy. The trailer has a tandem of a front axle 212 and rear axle 214. Given a unit axle capacity rating at 25,000 pounds, the suspension 200 to meet a rated capacity of 50,000 pounds total.

It is an aspect of the invention to improve heavy-duty leaf-spring suspension systems, which while are known to be advantageous in applications which require strength, but are also known to be disadvantageous for smooth ride performance, especially when the trailer 150 is unloaded of freight.

Figure 3:
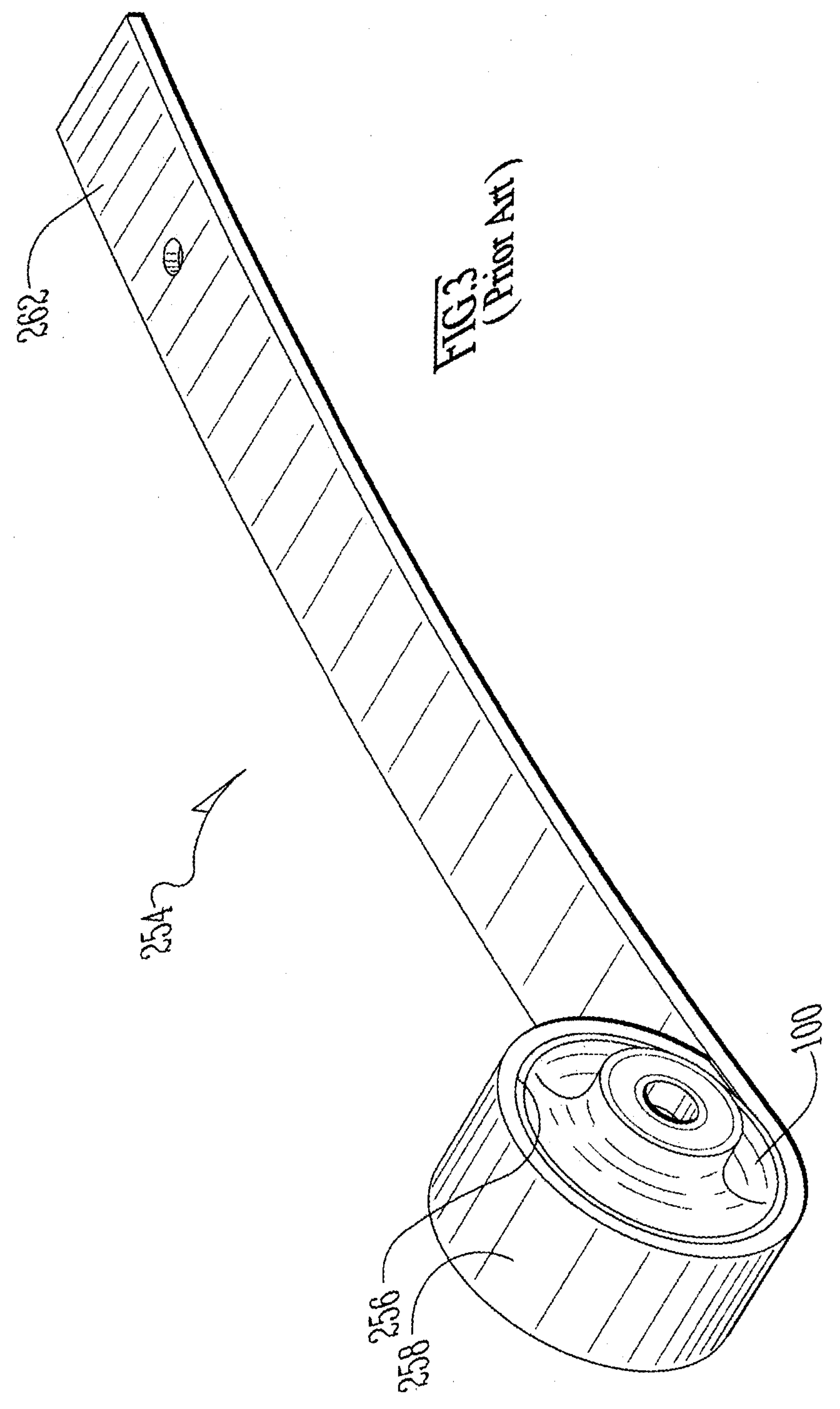
FIG. 3 is an enlarged-scale perspective view of an eyed leaf-spring control arm of standard leaf spring steel in accordance with the prior art, and shown in isolation.
Figure 4:
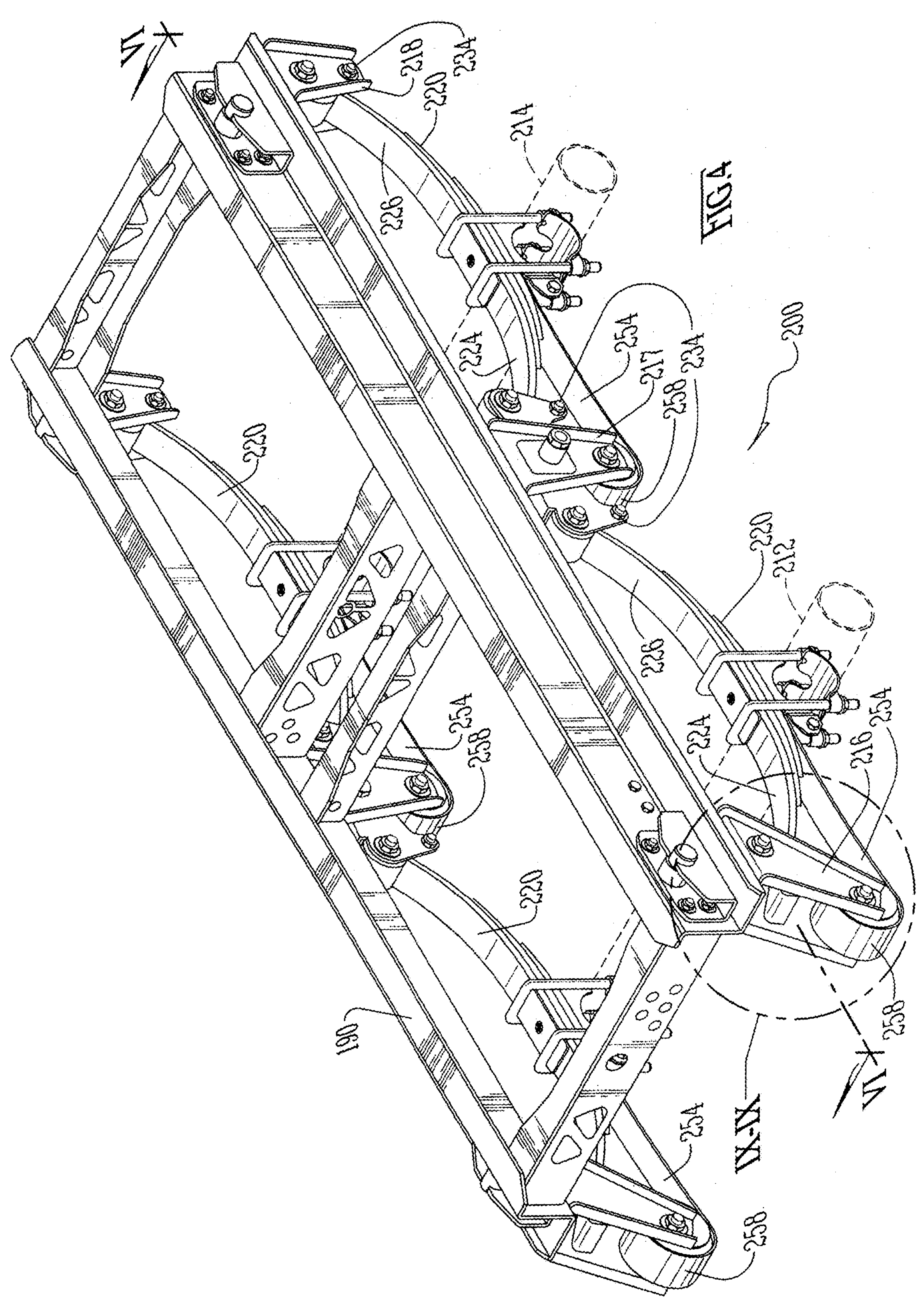
FIG. 4 is an enlarged-scale side perspective view comparable to FIG. 2A except of an overslung version (the leaf springs cross over the axles) of a slipper leaf-spring suspension system in accordance with the invention provided with compliant torque-and-load wear pad dampers in accordance with the invention.
Figure 5:
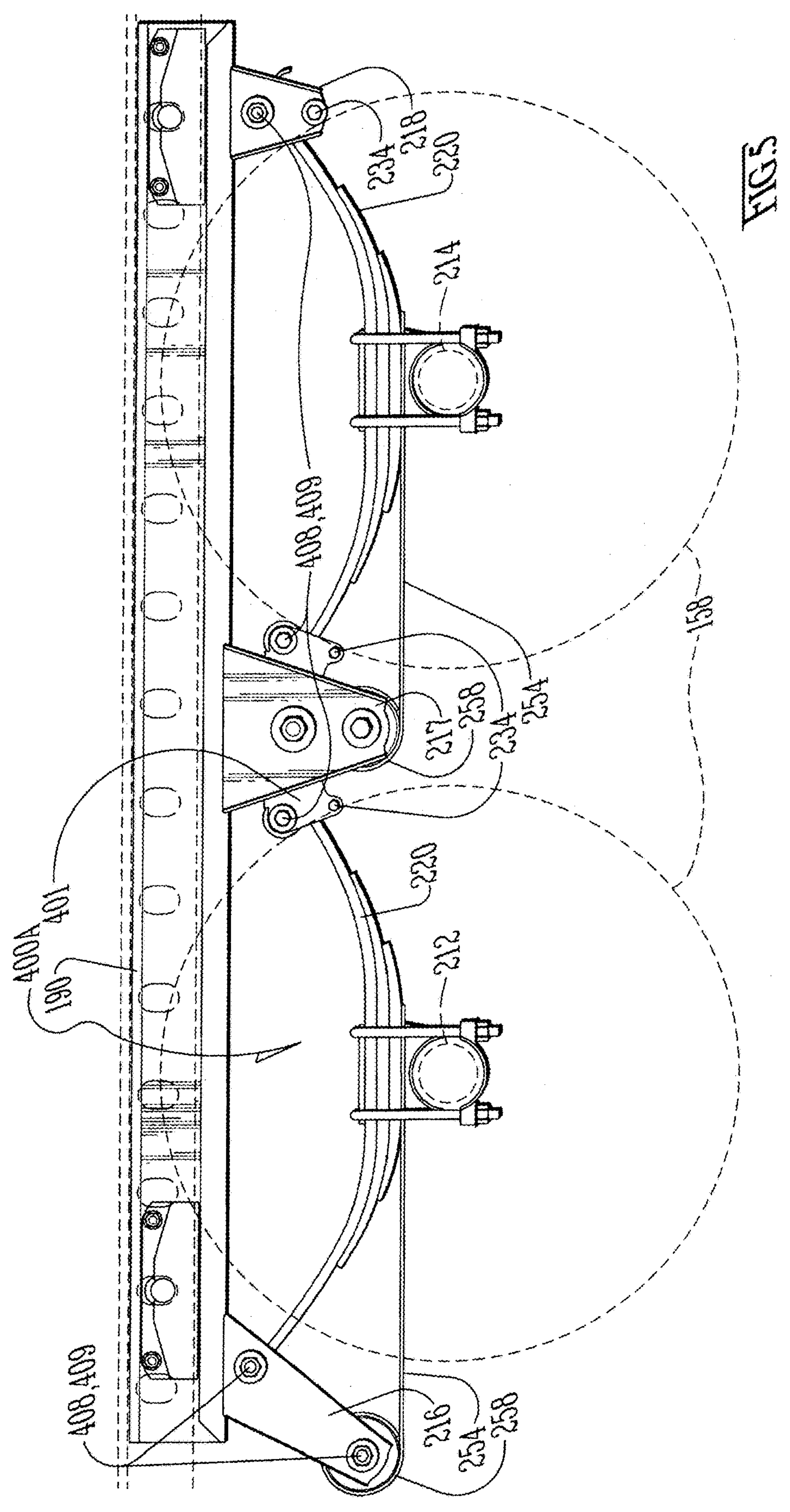
FIG. 5 is a side elevational view thereof.
Figure 6:
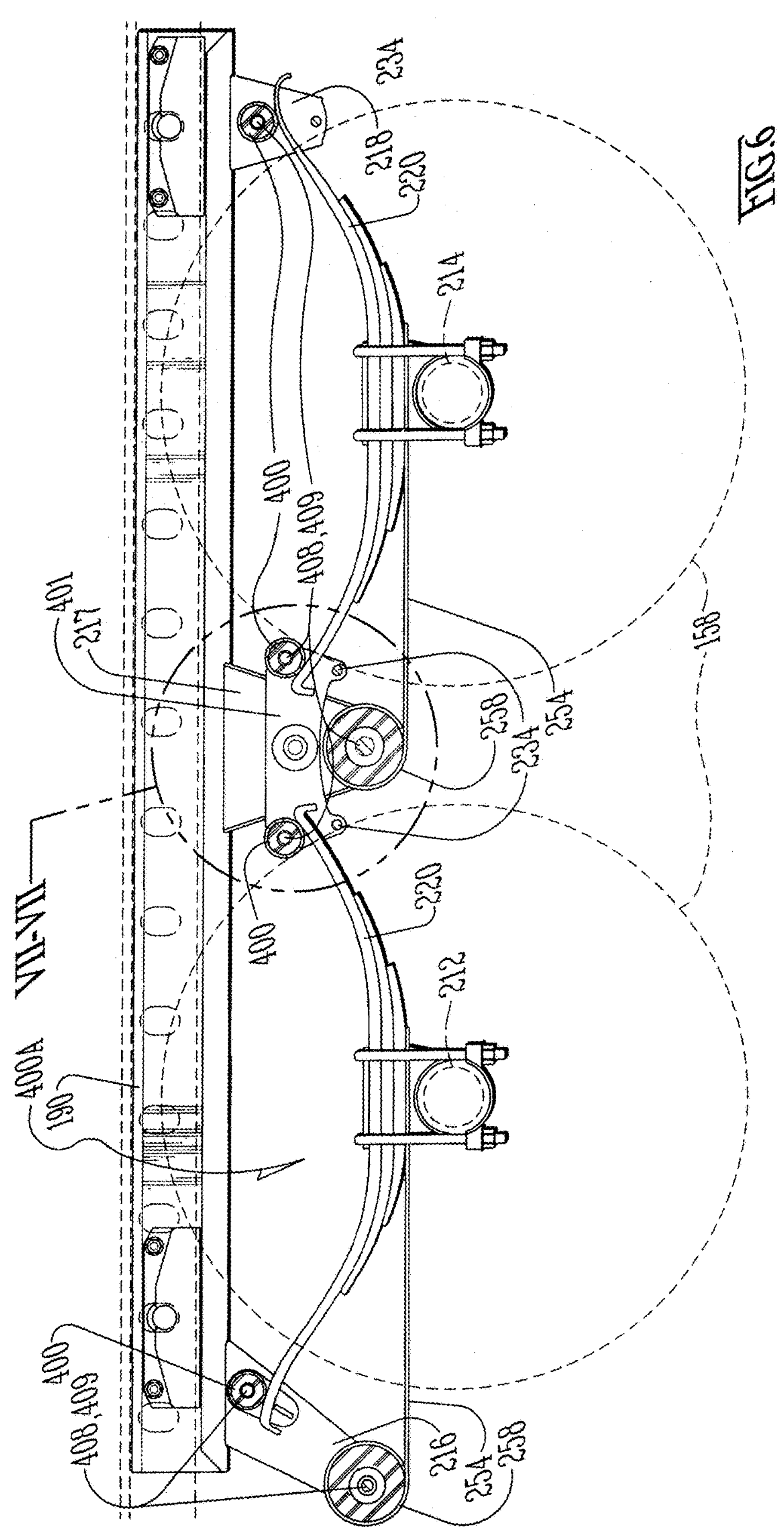
FIG. 6 is a side elevational section view comparable to FIG. 5 but taken along cutting line VI-VI in FIG. 4.
Figure 7:
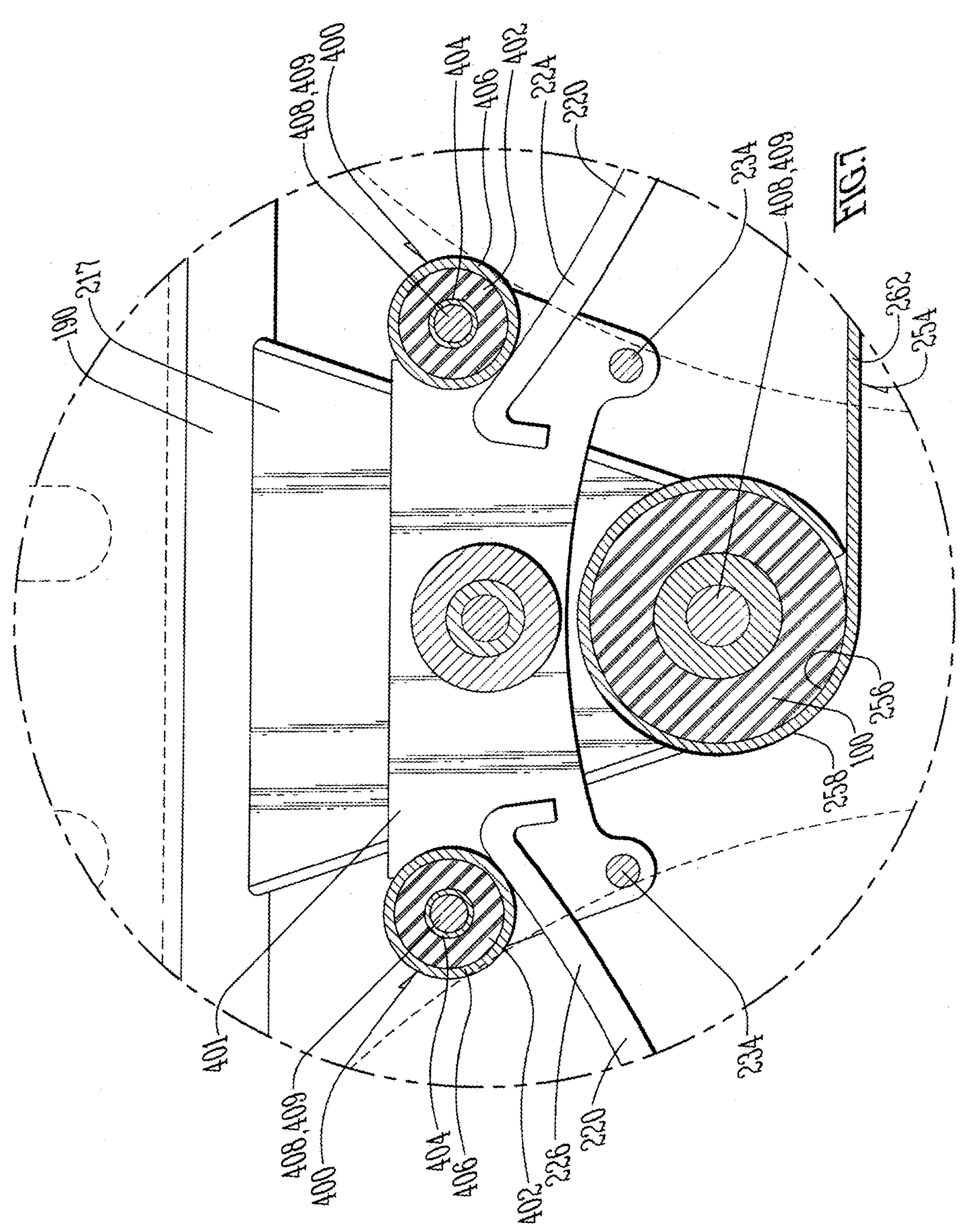
FIG. 7 is an enlarged-scale side elevational section view of detail VII-VII in FIG. 6.
Figure 8:
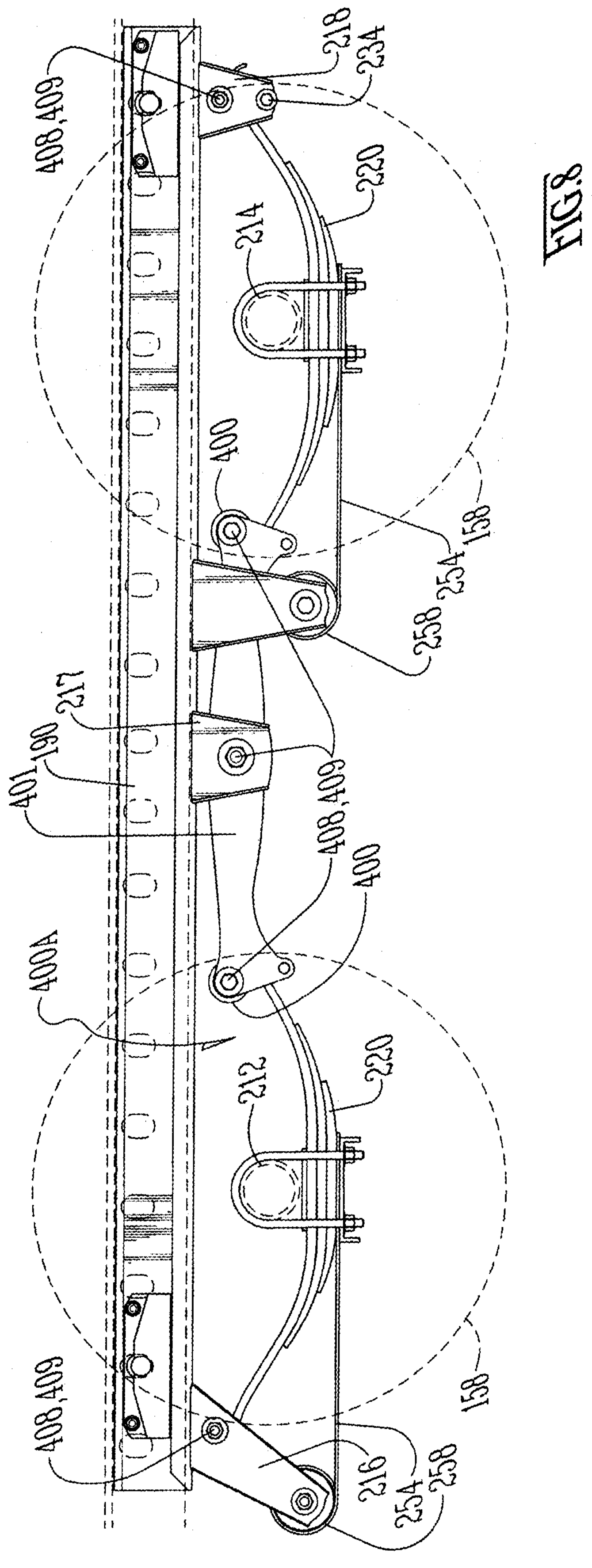
FIG. 8 is a side elevational view comparable to FIG. 5 except of an underslung version (the leaf springs cross underneath the axles) of a leaf-spring suspension system in accordance with the invention provided with compliant torque-and-load wear pad dampers also in accordance with the invention, except also showing a widespread equalizer.
Figure 9:
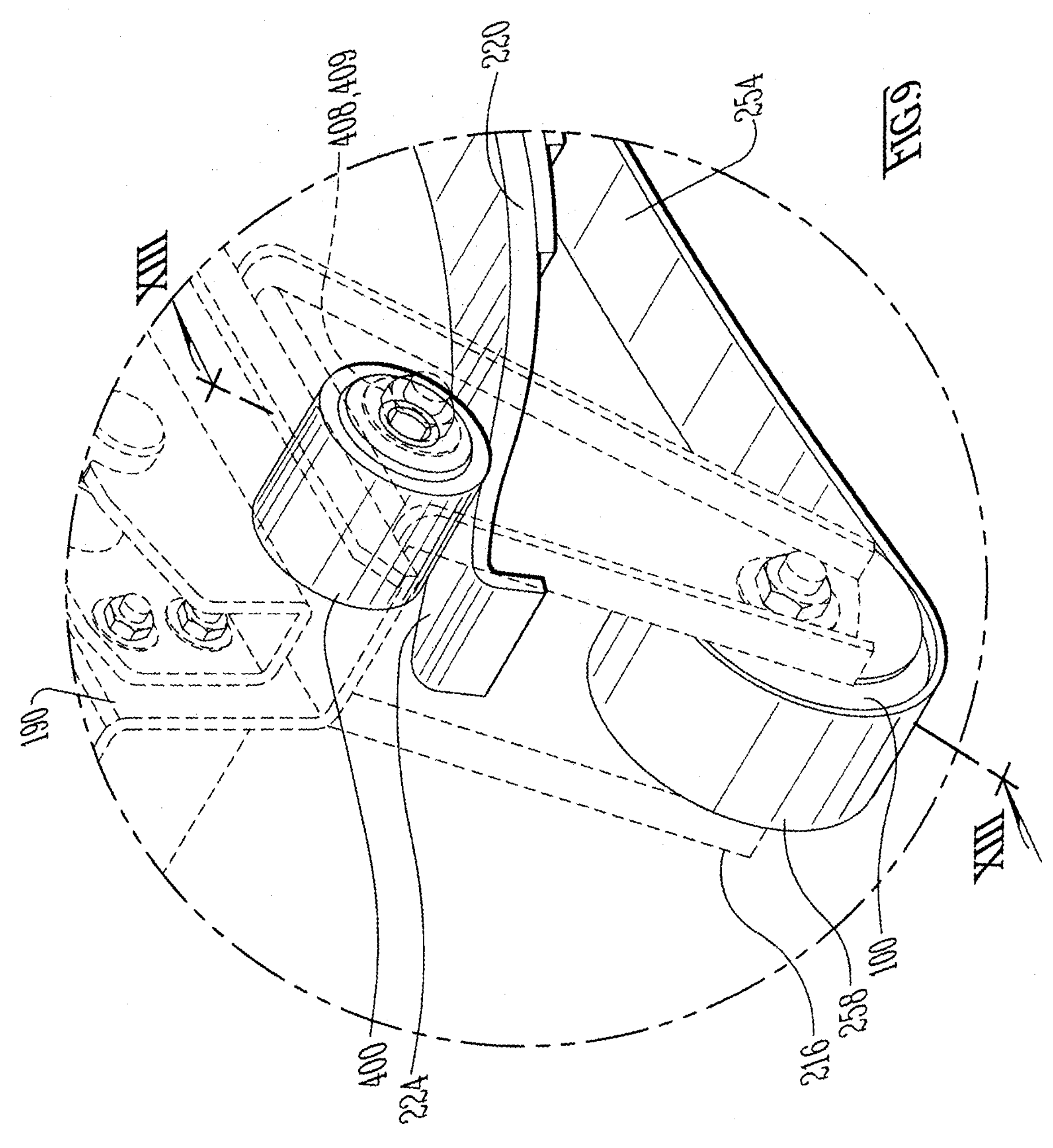
FIG. 9 is an enlarged-scale perspective view of the detail IX-IX in FIG. 4.
Figure 10:
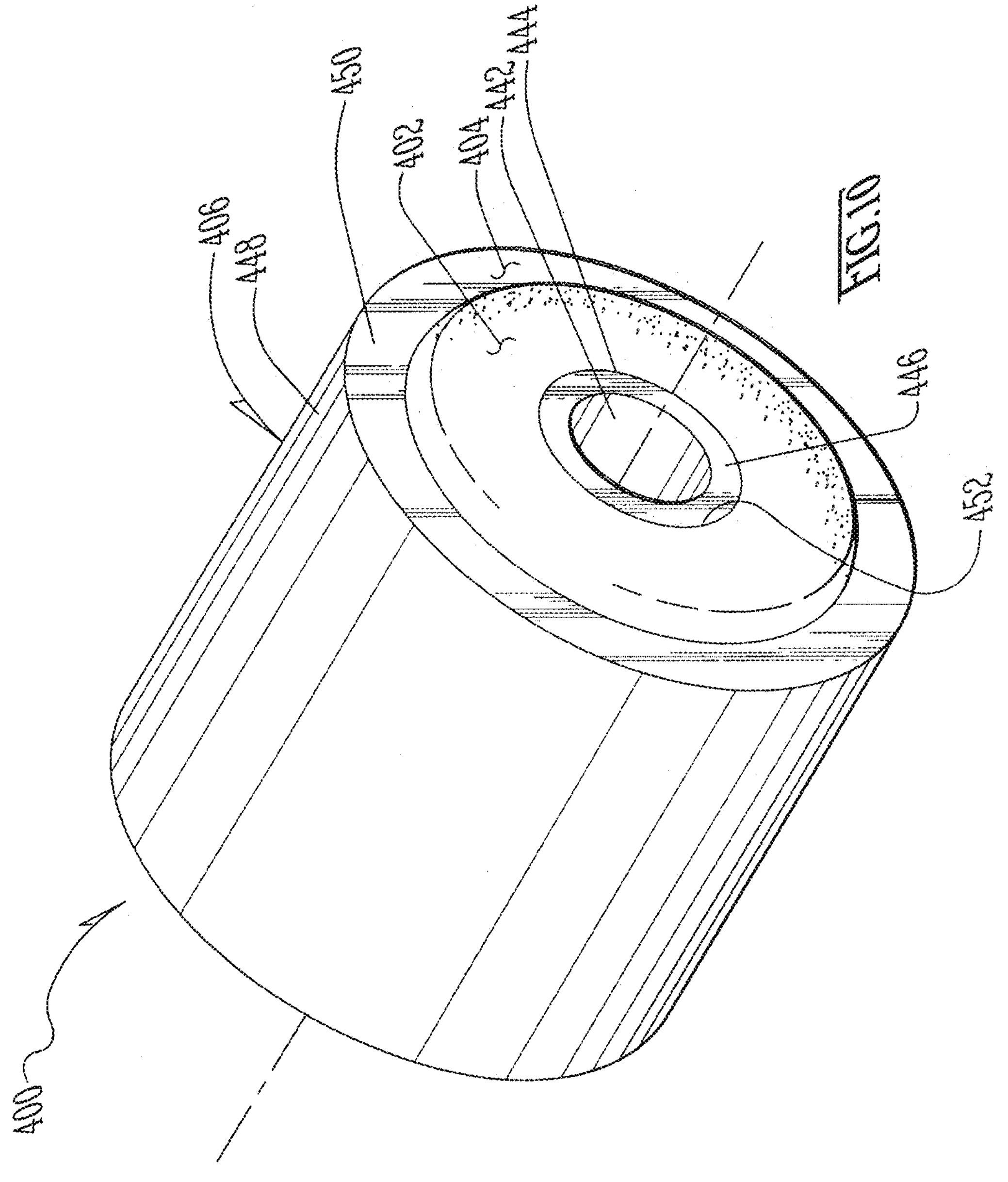
FIG. 10 is an enlarged-scale perspective view of the compliant torque-and-load wear pad damper shown in FIG. 9 shown in isolation.
Figure 11:
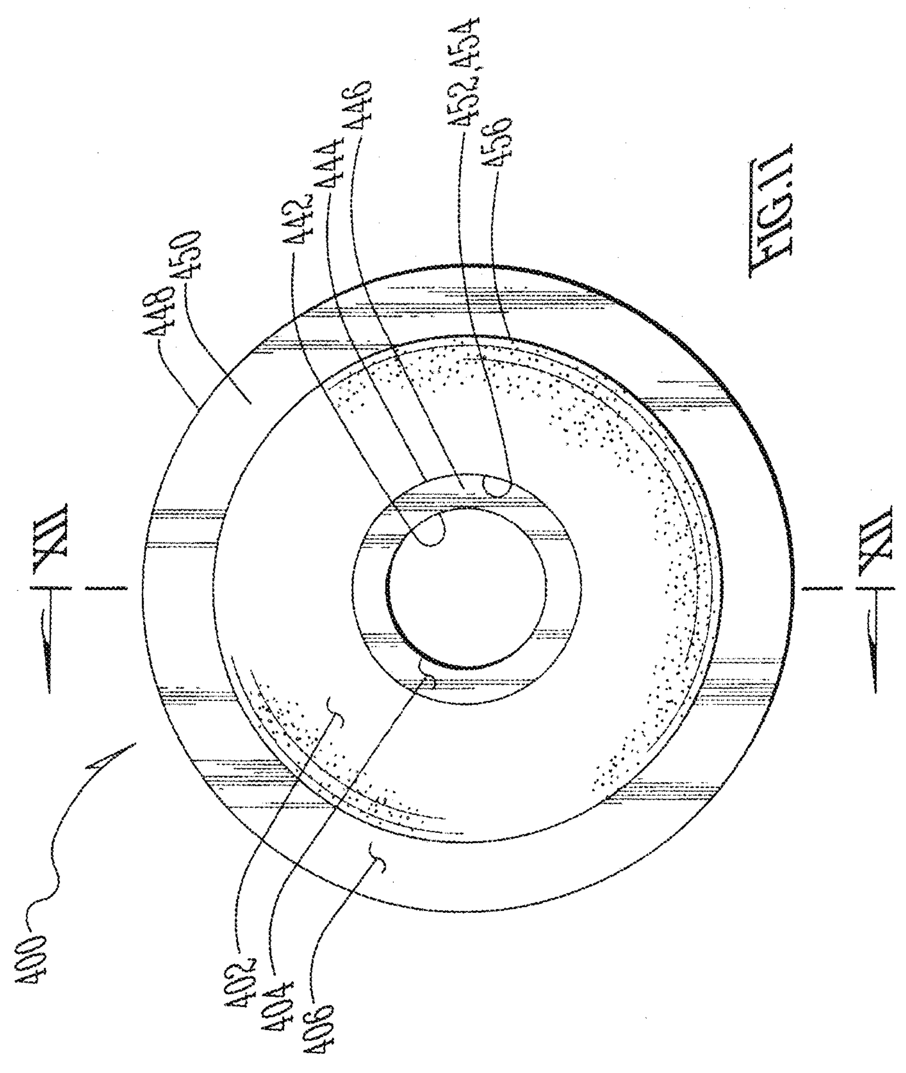
FIG. 11 is a side elevational view thereof.
Figure 12:
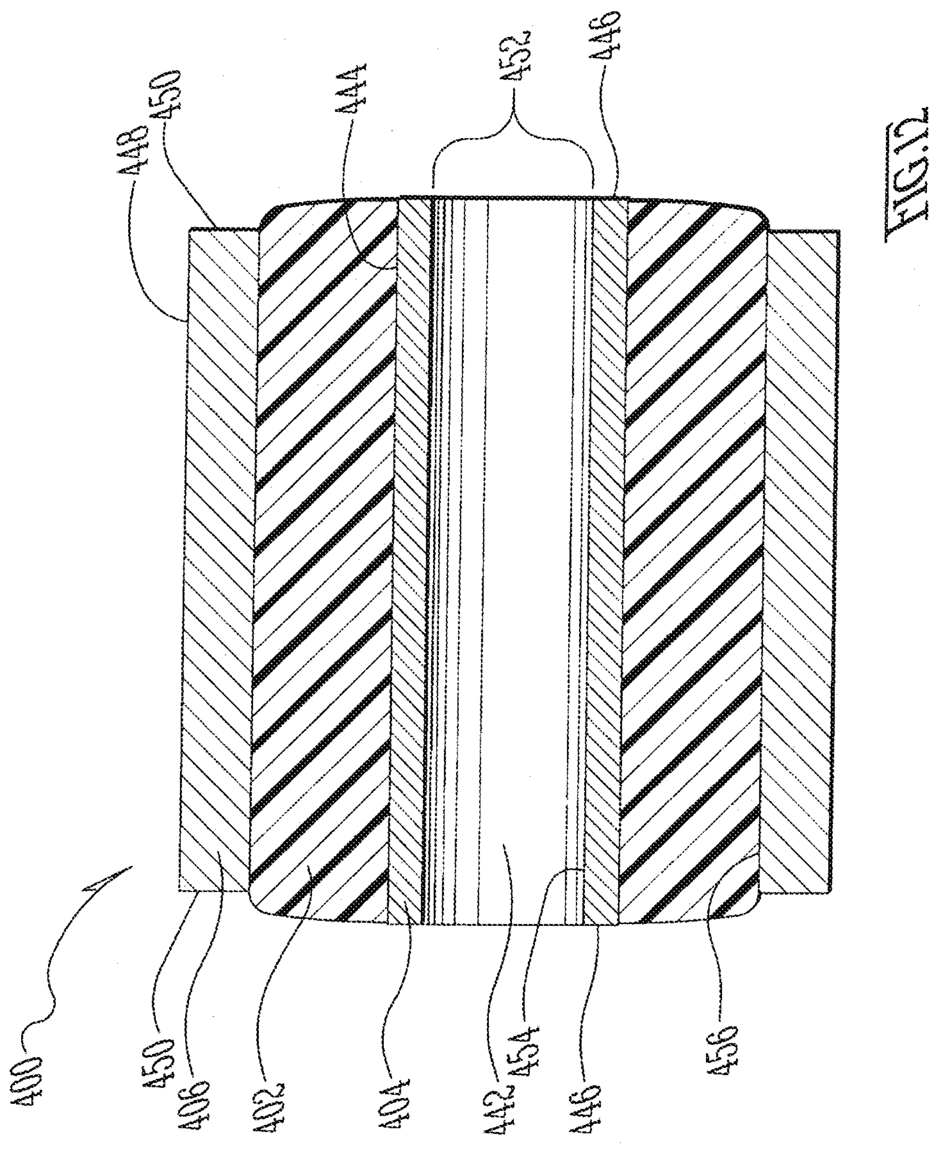
FIG. 12 is an axial sectional view taken along line XII-XII in FIG. 11.

FIGS. 1 through 3 comprise views of prior art matters, and the reference numerals appearing therein correspond to the following components or structure:

- 150, heavy-duty vehicle/semi-trailer (starting in FIG. 1);
- 152, under-hung tracks (vehicle);
- 156, vehicle frame;
- 158, tires;
- 100, compliant oversized pivot bushing (starting in FIGS. 2A and 2B);

190, sliding sub-frame;
200, slipper-type steel leaf-spring suspension system;
205, torque rod;
212, front axle, tandem;
214, rear axle, tandem;
216, front hangers;
217, middle hangers;
218, rear hangers;
220, steel stack leaf spring;
224, forward end, spring;
226, trailing end, spring;
228, upper broad surfaces, forward;
232, downward-facing wear pads, fixed relative to the hangers;
234, keeper pin (bolt shank);
236, axle seat or housing;
254, eyed leaf-spring control arm (starting in FIG. 3);
256, eye, of eyed leaf-spring control arm;
258, end, with eye; and
262, end, that is fastened or affixed to the axle seat (or axle housing).

II

Now to turn to the wear pads 232 as representative of non-compliant (eg., fixed, static and rigid) in accordance with the prior art, FIG. 2B is an enlargement of a typical con-compliant wear pad 232 in accordance of the prior art. That wear pad 232 is one of the eight (8) total support points in this dual axle suspension 200 (ie., at the ends of each spring 220, and that wear pad 232 must be rated to carry at least one-eighth of the 50,000 pound rated capacity: namely, 6,250 pounds.

So again in FIG. 2B, the contact force between slipper spring upper bearing surface 228 and wear pad 232 can be approximated as 6,250 pounds (~2,840 kg).

Note that, any road bump is going to provide an applied force at about 45° up through the suspension system, and as through the forward hung torque rod 205 (in FIG. 2B, at an angle from lower left to upper right). Thus there won't just be only a vertical component into the suspension system but a fore to aft component as well.

One problem has been as follows. When the contact force between slipper spring upper bearing surface 228 and wear pad 232 is approximately 6,250 pounds, the wear pad 232 is stationary (in the frame of reference of FIG. 2B), so the wear pad 232's surface that is in direct contact with the slipper spring upper bearing surface 228 is essentially clamped under a 6,250 pound force.

The problem is that, there is a sticking force between the wear pad 232's surface and the slipper spring upper bearing surface 228. That sticking force has to broken before the slipper spring surface 228 can slip by the wear pad 232.

This can likened to a giant rasping file that is three inches wide, being laid on the outside of an arcuate tab (eg., wear pad 232) with a 6,250 pound clamping force between the rasping file and the arcuate tab. It takes quite a bit of thrust to initiate a relative launch into movement, to initiate the rasping file breaking free of the friction or sticking force. But once broken free of the sticking force, the thrust required to keep the rasping file in slipper mode is a lot less than the breaking force to initiate breaking-free and launch.

The instance of 'breaking free of the sticking force' adds roughness to the ride. As an aside, the forces to launch from a state shown in FIG. 2B and then to return to a restored state (again, as shown in FIG. 2B) are asymmetric, and extremely so with prior art wear pads 232. That is, the forces to launch the springs 220 up to relatively flatten are much greater than the forces to fall back into the state approximately shown in FIG. 2B. That great asymmetry in forces in the cycle between up strokes and down strokes further contributes to ride roughness.

III

It is an object of the invention to provide compliant torque-and-load wear pad dampers 400 in accordance with the invention to slipper leaf spring suspensions 400A in accordance with the invention. This gives the inventive suspension system 400A better ability to handle road bumps without the tires and/or trailer being launched into bounce mode, and which therefore gives better ride quality not only when the trailer 150 is loaded with freight, but also when unloaded of freight too.

To turn next to FIGS. 4-13, a double axle slipper leaf spring suspension system 400A in accordance with the invention preferably comprises, in addition to the some but not all of the structure and components previously mentioned above in Section I, the following (more or less):

400, a plurality of compliant torque-and-load wear pad dampers (eg., eight);
400A, slipper leaf spring suspension system (eg., double axle);
401, left and right equalizers hung from the middle suspension hangers 217;
402, elastomeric annulus, sandwiched between:
404, rigid (steel) inner sleeve and
406, rigid (steel) outer sleeve;
408, a plurality of bolts/cap screws; and
409, a plurality of hex nuts therefor.

For the Inner Sleeve 404:

442, a central orifice;
444, an outer sidewall; and
446, spaced ends of the inner sleeve 404.

For the Outer Sleeve 406:

448, an outer sidewall; and
450, spaced ends for the outer sleeve 406.

For the Elastomeric Annulus 402:

452, a central hollow core for the elastomeric annulus 402;
454, inner sidewall of the central hollow core 452; and
456, outer sidewall of the elastomeric annulus 402.

IV

A few remarks follow regarding some of the foregoing matters.

Preferably the bolt or cap screw 408 is indeed a cap screw and more preferably a grade 8 cap screw, in a ⅞ inch diameter, with screw thread in a 9 threads per inch (UNC) size. The nut 409 preferably comprises a heavy-duty shear-off nut is adapted to thread onto the grade 8 cap screw 408. The heavy-duty shear-off nut 409 is made of metal with ductility properties, and has a break-neck groove scaled and configured relative to the ductility properties of the metal such that the break-away hex head twists off at a design torque comprising for example and without limitation 550 foot-pounds (~750 Newton-meters)±50 foot-pounds (~±70 Newton-meters).

The inner sleeve 404 is a tube of steel with the following non-exclusively preferred dimensions: the central orifice 442 has a nominal inside diameter of ⅞ inches (0.875 inches or 22.2225 mm), a length between ends 448 of three and a quarter inches (3.25 inches or 82.55 mm), and a wall thickness of 3⁄16 inches (0.1875 inches or 4.74625 mm).

The outer sleeve 406 is a tube of steel with the following non-exclusively preferred dimensions: the outer sidewall 448 has a nominal outside diameter of three and a half inches (3.5 inches or 88.9 mm)), a length between ends 450 of three and a quarter inches (3.25 inches or 82.55 mm), and a wall thickness of 3⁄8 inches (0.375 inches or 9.525 mm).

The elastomeric core sleeve 402 is selected from a suitable elastomeric/resilient material including without limitation natural rubber with a fairly high Durometer number, or a urethane and so on. The elastomeric core sleeve 402 preferably has a root width that fairly well matches the length of the inside sleeve 404 and a crown width that fairly well matches the length of the outside sleeve 406. The elastomeric core sleeve 402, the inside sleeve 404 and the outside sleeve 406 are all coaxial with one another on a common axis. The elastomeric core sleeve 402 occupies the annular gap between the inside sleeve 404 and outside sleeve 406 very tightly. In fact there is a slight outward bulge at the waist of the elastomeric core sleeve 402 but only perceptibly flaring outside the width of the inside sleeve 404.

V

The slipper-type leaf-spring suspension system 200 has the following aspects which are likely shared with slipper leaf-spring suspension system 400A.

A sub-frame 190 is constructed in a box construction of structural channel or I-beam steel. For a tandem axle design 212/214 (eg., front axle 212 and rear axle 214), six hangers 216-218 are suspended below the sub-frame 190: —there a pair of laterally-spaced forward hangers 216, a pair of laterally-spaced middle hangers 217, and pair of laterally-spaced trailing hangers 218.

Again, for a tandem axle design 212/214, there are four slipper leaf springs 220. Leaf spring 220 construction comprises a plurality of individual steel leaf springs stacked in a stack.

These slipper leaf springs 220 shown here (regardless of construction) are elongate between spaced forward and trailing ends 224 and 226, respectively, and show a shallow U-shaped bow in side profile. The slipper leaf-springs 220 are, proximate their ends 224 and 226, generally strips of plate or bar stock such that, while not tremendously beefy, are wider than they are thick. The slipper leaf-springs 220 have, proximate their ends 224 and 226, upper broad surfaces 228 and lower broad surfaces flanked between spaced relatively thinner sides. The hangers 216-218 present downward-facing wear pads 232 for the upper broad surfaces 228 of the slipper leaf-springs 220 to rub against and translate therealong as the springs 220 flex between relative straightening and relative sagging.

If the bouncing is too severe, the upper broad surfaces 228 can separate from the wear pads 232. There is typically a keeper pin 234 (bolt shank) to limit the downward separation of the ends 224 and 226 of the slipper leaf-springs 220. In the industry, the rejoining of the ends 224 and/or 226 of the slipper leaf-springs 220 with the wear pads 232 is referred to as 'spring slap.'

Again, the slipper leaf-springs 220 have a shallow U-shaped bow in side profile. At the belly of this shallow U-shaped bow in side profile there is usually a fastened or an affixed axle seat or housing 236. Hence for a tandem axle 212/214 arrangement, there will typically be four slipper leaf-springs 220. More particularly, there will be a spaced apart forward pair of slipper leaf-springs 220 spanning between a forward and middle hanger 216 and 217 respectively. There will be a spaced apart trailing pair of slipper leaf-springs 220 spanning between a middle and trailing hanger 217 and 218 respectively.

Slipper leaf-springs 220 might have the very tip ends (see, eg., 226 in FIG. 2B) which extend clear beyond the respective wear pad 232 or keeper pin 234, bent downward in a gentle hook or an abrupt crease.

The compliant oversized pivot bushing 100 might have the following proportions, for example and without limitation. The bushing 100 comprises an elastomeric annulus (eg., elastomeric torsion spring) mounted on a rigid sleeve.

The rigid sleeve is preferably a stubby hollow cylinder of stainless steel or the like, having:—

- a central orifice characterized by an inside diameter,
- an outer sidewall characterized by an outside diameter,
- a wall thickness, measured between the inner sidewall of the central orifice and the outer sidewall, as well as
- a width (ie., axial length) measured between spaced ends.

Representative measurements for rigid sleeve might include the following as an example and without limitation:—

- inside diameter=1¼ inches (3.175 cm);
- outside diameter=2⅝ inches (6.6675 cm);
- wall thickness=11⁄16 inches (1.74625 cm); and
- width=3½ inches (8.89 cm).

To turn to the elastomeric annulus, the elastomeric annulus might comprise for example and without limitation the following characteristics, such as:—

- a central hollow core characterized by an inside diameter which is equal to the outside diameter of the sleeve,
- an overall wall thickness measured between the inner sidewall of the central hollow core and an outer sidewall,
- wherein the outer sidewall characterized by an outside diameter, that is sum of the inside diameter plus twice the wall thickness.

The cross-sectional profile of the elastomeric annulus might vaguely be reckoned as resembling a mushroom-shaped profile. That is, the mushroom-shaped profile of the wall of elastomeric annulus might comprise for example and without limitation the following characteristics, such as:—

- a root spread of thickness with a width equal to the width of the rigid sleeve,
- a root flare of thickness (also generally corresponding to a radius of curvature for the root flare);
- an hourglass shaped stem portion with a thickness and a minimum width at the waist thereof, and
- a crown spread of thickness and width, which crown spread's outer surface corresponds to the outer sidewall for the elastomeric annulus.

Representative measurements for elastomeric annulus might include the following as an example and without limitation:—

- inside diameter=2⅝ inches (6.6675 cm);
- overall wall thickness=1 11⁄16 inches (4.28625 cm);
- outside diameter, =6 inches (15.24 cm)
- root spread thickness=3⁄16th inch (0.47625 cm);
- root spread width=3½ inches (8.89 cm);
- root flare thickness=½ inch (1.27 cm);
- hourglass-shaped stem portion thickness=¾th inch (1.905 cm);
- hourglass-shaped stem portion's minimum width at waist=2 inches (5.08 cm);
- crown spread thickness=¼th inch (0.635 cm); and
- crown spread width=2¼ inches (5.715 cm).

For another example and without limitation, the elastomeric annulus proportions could be a 2½ inch (6.35 cm) wide bushing 100 at width with a 'unsqueezed' outside elastomeric diameter, of at least 5 inches (12.7 cm).

Figure 13:
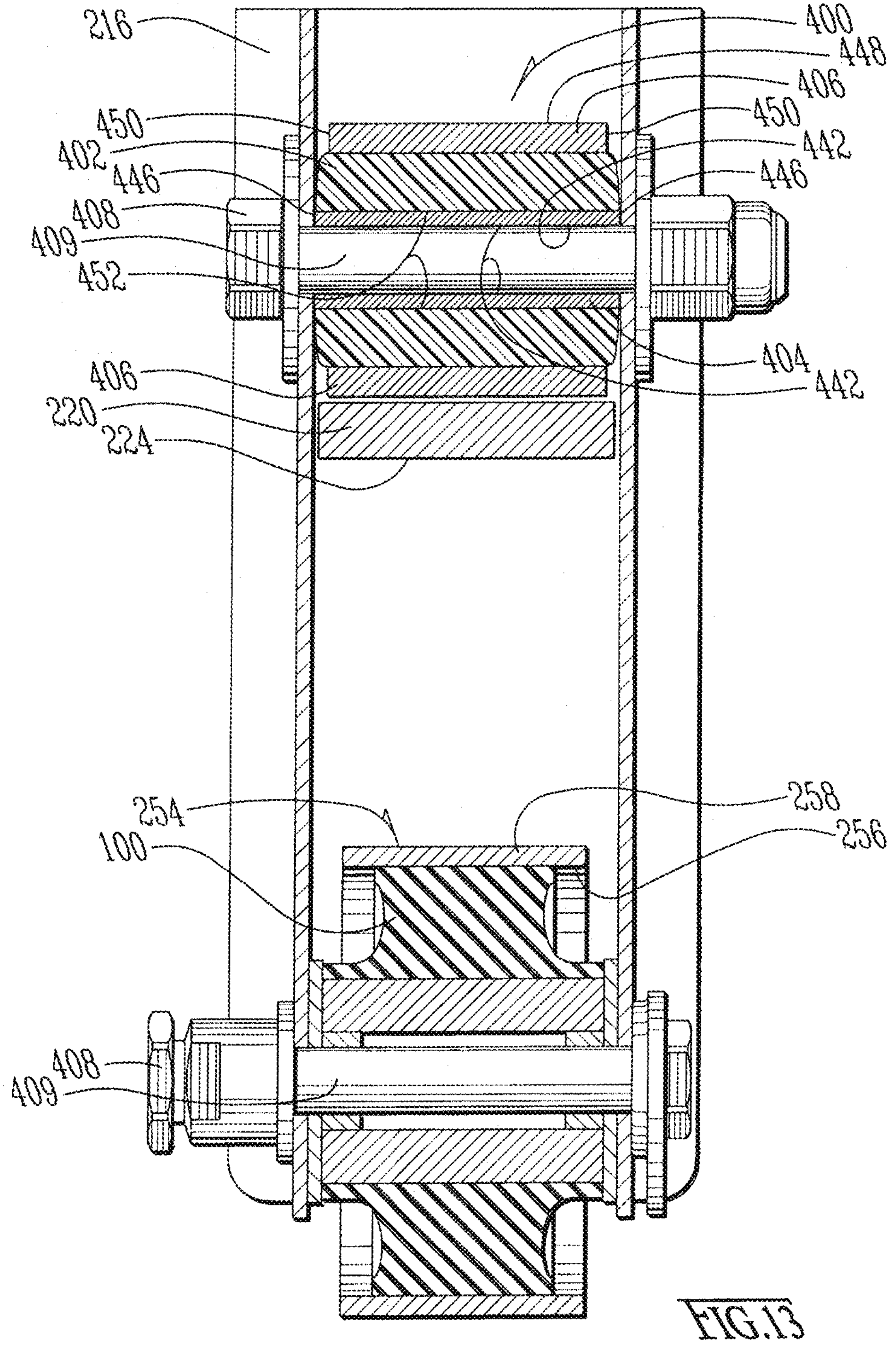
FIG. 13 is an enlarged-scale sectional view taken along the line XIII-XIII in FIG. 9.

As can be readily reckoned in FIGS. 13-15, the geometry of the bushing 100 and its eye mount are all arranged on a cylindrical geometry where all cylindrical sidewalls are characterized by a common central axis of symmetry (ie., they all are co-axial on common central axis of symmetry. As better shown in FIG. 13, the through bolt 408 has a slightly smaller outside diameter than the inside diameter of the central orifice of the rigid sleeve. This creates an annular air gap between the inner sidewall of the central orifice and the through bolt 408. Nevertheless, the common symmetry between the through bolt 408 and central orifice is maintained by a pair of annular, abbreviated spacer/sleeves spaced apart at the inboard and outboard ends of the rigid sleeve.

All the example measurements above are referred to as 'unsqueezed' inasmuch as, where the measurements apply to the elastomeric annulus, the measurements are taken before it is compressed into the eye housing 256 therefor in the control arm 254, and/or otherwise before there is any stress or distortion applied thereto.

XI

For slipper spring vehicle suspension 400A, a compliant torque-and-load wear pad damper 400 has a steel tubular inner sleeve 404 and an oversized steel tubular outer sleeve 406 which together define a lumen defining a generously-sized cylindrical annular space, as well as an elastomeric intermediate sleeve 402 press-fitted tightly into the cylindrical annular space and immovably fixed to both sleeves 404 and 406.

The elastomeric sleeve 402 has stiffness properties that resist torsional distortion. The inner sleeve 404 is longer than the outer sleeve 406 and is immovably fastened with respect to its respective hanger 216-218 respectively whereby the outer sleeve 406 is free to float subject to the stiffness of the elastomeric material 402 that is resistant to torsional distortion.

The compliant torque-and-load wear pad dampers 400 can be used with steel leaf springs 220 as shown in FIGS. 4 through 9, or torque springs or else torque rods as shown in FIG. 2A, as well as both for overslung or underslung suspensions.

Another advantage of compliant torque-and-load wear pad dampers 400 is that they include a steel inner tubular sleeve 404 that allows the compliant torque-and-load wear pad damper 400 to bolted inside its respective hanger 216-219 respectively. Albeit, preferably with grade 8 cap screws 408. So the compliant torque-and-load wear pad damper 400 is a "bolt in" wear surface which eliminates weldments to the side plates of the hanger structure 216-218, provides a bolted-tight (inner) sleeve 404 between the plates of the respective hanger 216-218 for strength, and allows replacement.

Thus compliant torque-and-load wear pad dampers 400 can be easily replaced after years of service, can act as a vertical damping means, and can at as a rotational damping means for due to the leaf spring 220's translational movement.

As for the brake torque control, a torque rod with bushings on both ends can be used (not shown in FIGS. 4-9), but instead shown in FIGS. 4-9 and 13 is a control arm spring 254 with a compliant oversized pivot bushing 100 to improve the fore/aft ride characteristics of the suspension system 400A.

The suspension system 400A in accordance with the invention can be used for several different types of suspension/vehicle applications: eg., overslung axle, underslung axle, frame hanger mounted, wide spread axles, slider configuration for platform or van type applications, and can be assisted with an air spring helper for a hybrid-style system to give an even better ride.

In summary, the compliant torque-and-load wear pad dampers 400 have a steel outer sleeve 406 that encases a rubber bushing 402. The steel outer sleeve 406 contacts the steel upper bearing surface 228 of the leaf spring 220 for vertical contact inside the suspension hangers 216-218 (rockers/equalizers 401). By replacing the rigid hanger wear pad (eg., 232 in FIGS. 2A and 2B) with a sleeved natural rubber (or urethane) bushing 402, the leaf springs 220 have improved vertical damping in the elasticity of the rubber 402 as well as a torsional damping effect likewise due to twisting or torsional distortion of the rubber bushing 402. And the outer sleeve 406 yields/displaces slightly to dynamic force impulses that have both a normal component on the outer sleeve 406's sidewall 448 as well as a tangential component on the outer sleeve 406's sidewall 448.

A highly fanciful contrast between the state of the prior art with fixed steel wear pads (eg., 232 in FIGS. 2A and 2B) and an advantage gained by the compliant torque-and-load wear pad dampers 400 in accordance with the invention is given now in these closing paragraphs. Recall in FIG. 2B that there is essentially three tons of contact force between the wear pad 232 and slipper spring outer surface 228.

Imagine fanciful Situation 1.0: —a three ton cinder block resting on a paved roadway. It would humanly impossible for anyone to lean and push on that cinder block and induce any translational movement. The friction force is too great.

Imagine (not so) fanciful Situation 2.0: —a three ton Sports Utility Vehicle (SUV) stalled on the same paved roadway. In this situation, it is indeed humanly possible to put the SUV in neutral and push it off to the side of the road. This is done all the time to get stalled cars off the road. This time, the rolling friction force is light enough.

The compliant torque-and-load wear pad dampers 400 in accordance with the invention represent a Situation 1.5: —that is, somewhere in between Situation 1.0 and 2.0.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A slipper leaf-spring vehicle suspension system, comprising:

left and right steel slipper leaf springs each comprising a main body and front and rear slipper leaf spring ends, wherein the main body extends between the front and rear slipper spring ends, in a shallow U-shaped bow shape, and which left and right slipper leaf spring ends have spaced front and rear upper surface portions proximate the respective front and rear slipper ends defining left and right front and rear upper bearing surfaces (228);

an axle and spaced left and right axle mounts, wherein the axle is mounted to the left and right slipper springs with respect to the spaced left and right axle mounts respectively;

front left and right suspension hangers;

rear left and right suspension hangers;

left and right elongate control arms each comprising a main body and forward ends (258) and trailing ends (262), wherein each control arm's main body extends between the forward and trailing ends (258 and 262), and wherein the forward (258) ends are mounted to the front left and right suspension hangers respectively, and, the respective left and right trailing ends (262) are connected with respect to the left and right axle mounts respectively;

left and right front and rear compliant torque-and-load wear pad dampers (400) mounted crosswise through the left and right front suspension hangers and left and right rear suspension hangers respectively;

wherein each of the compliant torque-and-load wear pad dampers (400) comprises:

a steel tubular inner sleeve (404) which is elongate between spaced left and right ends, a steel tubular outer sleeve (406) which is elongate between respective spaced left and right ends thereof, wherein the outer wall of the inner sleeve and inner wall of the outer sleeve define a generous cylindrical annular space, and an elastomeric intermediate sleeve (402) filling the cylindrical annular space and immovably fixed to both the outer sidewall of the inner sleeve (404) and inner sidewall of the outer sleeve (406), said steel tubular outer sleeve (406) having an outer sidewall (448);

wherein the slipper leaf-spring vehicle suspension system is sized and configured such that:

the left front upper bearing surface (228) and left front compliant torque-and-load wear pad damper (400)'s outer sleeve (406)'s outer sidewall (448) oppose each other and are in frictional engagement with each other, the right front upper bearing surface (228) and right front compliant torque-and-load wear pad damper (400)'s outer sleeve (406)'s outer sidewall (448) oppose each other and are in frictional engagement with each other, the left rear upper bearing surface (228) and left rear compliant torque-and-load wear pad damper (400)'s outer sleeve (406)'s outer sidewall (448) oppose each other and are in frictional engagement with each other, and the right rear upper bearing surface (228) and right rear compliant torque-and-load wear pad damper (400)'s outer sleeve (406)'s outer sidewall (448) other and are in frictional engagement with each other; and wherein each inner sleeve (404) is immovably fastened with respect to the respective suspension hanger respectively as the outer sleeve (406) is free to rotate with respect to any resistance from the respective suspension hanger while subject to substantial resistance to rotate subject to the stiffness of the elastomeric material (402) that is resistant to torsional distortion, whereby providing rotational damping means.

2. The slipper leaf-spring vehicle suspension system of claim 1, wherein:

the leaf springs comprise strips of plate or bar stock.

3. The slipper leaf-spring vehicle suspension system of claim 1, wherein:

each leaf spring comprises a plurality of individual steel strips of plate or bar stock stacked in a stack.

4. The slipper leaf-spring vehicle suspension system of claim 3, wherein:

the leaf springs measure X inches wide, where X is a non-zero positive number.

5. The slipper leaf-spring vehicle suspension system of claim 1, further comprising:

a multiplicity of keeper pins (234), one for each suspension hanger;

wherein each slipper end of each slipper leaf spring terminates as bent downward in a gentle hook or an abrupt crease; and wherein each keeper pin (234) is immovably mounted and extended underneath where each slipper end of each slipper leaf spring terminates as bent downward in a gentle hook or an abrupt crease;

whereby the keeper pins (234) limit downward separation of the slipper ends (224 and 226) of the slipper leaf springs (220).

6. The slipper leaf-spring vehicle suspension system of claim 1, further comprising:

a pair of hanger bolts;

wherein each control arm forward end is formed in an eye (256); and each control arm is mounted to the respective suspension hanger by fastening a respective one of the hanger bolts through the respective eye (256).

7. A tandem or multi-axle slipper leaf-spring vehicle suspension system, comprising one slipper leaf-spring vehicle suspension system according to claim 1 combined with another slipper leaf-spring vehicle suspension system also according to claim 1, wherein:

the left and right rear suspension hangers of the one slipper leaf-spring vehicle suspension system according to claim 1 are shared and are the same as the left and right front suspension hangers of the other slipper leaf-spring vehicle suspension system according to claim 1;

whereby the left and right front and rear compliant torque-and-load wear pad dampers (400) of the one slipper leaf-spring vehicle suspension system according to claim 1, and, the left and right front and rear compliant torque-and-load wear pad dampers (400) of the other slipper leaf-spring vehicle suspension system according to claim 1, are mounted to the mounted to the shared/same left and right rear suspension hangers of the one slipper leaf-spring vehicle suspension system according to claim 1/left and right front suspension hangers of the other slipper leaf-spring vehicle suspension system according to claim 1 at relatively frontward and rearward spaced dispositions respectively.

8. The tandem or multi-axle slipper leaf-spring vehicle suspension system of claim 7, further comprising:

respective left and right equalizers (401) mounted to the shared/same left and right rear suspension hangers of the one slipper leaf-spring vehicle suspension system according to claim 1/left and right front suspension hangers of the other slipper leaf-spring vehicle suspension system according to claim 1;

whereby the left and right front and rear compliant torque-and-load wear pad dampers (400) of the one slipper leaf-spring vehicle suspension system according to claim 1, and, the left and right front and rear compliant torque-and-load wear pad dampers (400) of the other slipper leaf-spring vehicle suspension system according to claim 1, are mounted to the left and right equalizers (401) at relatively frontward and rearward spaced dispositions respectively.

9. The tandem or multi-axle slipper leaf-spring vehicle suspension system of claim 7, further comprising:

respective left and right equalizers (401) mounted by respective left and right pivot connections to the shared/same left and right rear suspension hangers of the one slipper leaf-spring vehicle suspension system according to claim 1/left and right front suspension hangers of the other slipper leaf-spring vehicle suspension system according to claim 1; and the left and right front and rear compliant torque-and-load wear pad dampers (400) of the one slipper leaf-spring vehicle suspension system according to claim 1, and, the left and right front and rear compliant torque-and-load wear pad dampers (400) of the other slipper leaf-spring vehicle suspension system according to claim 1, are mounted to the left and right equalizers (401) on opposite forward and rearward disposition of the respective left and right pivot connections.

10. The slipper leaf-spring vehicle suspension system of claim 1, wherein:

the left and right axle mounts comprise axle seats.

* * * * *